Patented May 9, 1950

2,507,207

UNITED STATES PATENT OFFICE 2,507,207

INSECTICIDE COMPRISING CYCLO-DIENE QUINONE ADDUCTS

Julius Hyman, Chicago, Ill.

No Drawing. Application February 16, 1946, Serial No. 648,204

3 Claims. (Cl. 167—30)

This invention relates to insecticides. More particularly the present invention relates to the insecticidal properties of certain Diels-Alder adducts and their novel employment for the control and destruction of noxious and harmful insect life.

In general the present invention relates to the Diels-Alder adducts (i. e. addition products) of halogenated quinones and dienes, their insecticidal properties, their employment as insecticides, and to insecticidal compositions and formulations containing them as active ingredients.

The Diels-Alder Diene Synthesis (or, as frequently described more simply, the Diene Synthesis) is now so well established and understood in the field of organic chemistry that no detailed discussion of it will be given here. Suffice it to say that this synthesis consists of the 1,4-addition to a conjugated diene of double or triple bond. The unsaturated compound participating in the reaction with the diene is called a dienophile. The product of the reaction is called an adduct; and the reactants, the diene and dienophile, are referred to jointly as generators of the adduct, or simply as generators.

The Diels-Alder adducts of halogenated quinones with dienes which comprise the active ingredients of the insecticidal compositions of my invention form a large class, since both the halogenated quinone and the diene may be selected from groups having numerous species. Thus, for example, halogenated quinones may contain chlorine, bromine, or fluorine, or any combination of these halogens. The halogenated quinones may possess, in addition to halogen, a radical which may be an alkyl, aryl, arylalkyl or cycloalkyl radical or unsaturated groups corresponding to those just listed or appropriately substituted groups in those general classifications. Among the halogenated quinones which may be utilized may be mentioned, for example, halogenated benzoquinone, toluquinone, and a-napthoquinone. Similarly, among utilizable dienes may be mentioned cyclopentadiene, butadiene, isoprene, piperylene, and many other 1,3-conjugated dienes which are known to act as dienes in the Diels-Alder Diene Synthesis.

The adducts of halogenated quinones with dienes are prepared with great readiness. The method described by Walter Albrecht, Ann. 348 31–49 (1906) may be employed. I prefer, however, to use the procedure described in the following example in which is set forth, for purposes of illustration, the preparation of the Diels-Alder adduct of tetrachlorobenzoquinone and cyclopentadiene.

To 100 g. of chloranil in 600 ml. of commercial dioxane contained in a three-neck flask equipped with reflux condenser, mechanical stirrer and thermometer is added 27.5 g. of freshly distilled cyclopentadiene. The temperature is raised to and maintained at 40° C. for 12 hours. During this time an additional 27.5 g. of cyclopentadiene is added portionwise to the reacting mixture. When the further addition of cyclopentadiene no longer causes intensification of the color of the reacting mixture the reaction is complete.

Most of the dioxane is removed in vacuo. The remaining solution is diluted with water and the crude product thus precipitated is collected, washed and dried in vacuo. The crude dried product is extracted with 1200 ml. of boiling methanol.

The first crop of crystals thus obtained from the cooled methanol solution melts at 143–165° C. and is the desired chloranil adduct contaminated with small amounts of chloranil. The crude solid is then further extracted five times, using for each subsequent extraction the mother liquor remaining after crystallization of the preceding extract. Re-extraction of the first crop of contaminated adduct results in its purification. All told, by this procedure, over 90 g. of adduct melting at 143–146° C. (M. P. reported in the titration is 146° C.) is obtained.

The structural formula of the adduct thus prepared is as follows:

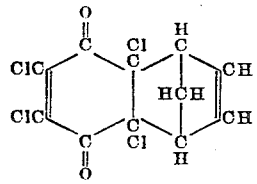

As has been previously indicated, however, there is wide latitude in the choice of (1) the quinone, (2) the kind and number of the halogens in the quinone, (3) the kind and number of radicals in the quinone, and (4) the diene utilized.

Thus, where the diene employed is cyclopentadiene, the range of modifications may be expressed in the formula

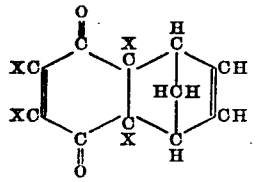

where X may represent a halogen atom, a hydrogen atom, or a radical; but at least one of the groups so represented is a halogen. The radical may be an alkyl, aryl, arylalkyl or cycloalkyl radical or unsaturated groups corresponding to those just listed or appropriately substituted groups in those general classifications.

The same range of modifications exists when other dienes, such as, for example, butadiene, isoprene, and piperylene are employed instead of cyclopentadiene in the Diene Synthesis, making due allowance, of course, for such changes as are necessitated by the structural differences in the dienes.

I have found it possible to prepare a wide variety of insecticidal compositions of enhanced efficiency, utility, economy and control containing the adducts of halogenated quinones and dienes as active ingredients in combination with suitable carriers such as solvents, extenders or adjuvants. The nature of these carriers is dependent upon the type of composition involved. Thus, in the case of a dust, the carrier may be talc or pyrophillite. In the case of an oil spray, the carrier may be an oil such as a hydrocarbon or other oil. Where it is desired to apply an insecticidal aqueous emulsion, the insecticidal composition may be an emulsion concentrate in which the carrier of the adduct is a suitable organic solvent and an appropriate amount of wetting and emulsifying agents. My compositions, appropriately formulated, may also be used as aerosols and in other ways known to the art. They may be employed with other insecticides, if desired, and applied in any manner known to the art that will utilize their properties effectively.

To illustrate the insecticidal properties of the compositions of my invention, I will cite the results of tests made with an oil spray utilizing as an active ingredient the chloranil-cyclopentadiene adduct of the foregoing example. These tests were made on the common housefly according to the standard Peet-Grady large group method. The compositions employed in the tests utilized an inert hydrocarbon base oil, Deobase, as the carrier. Since the Peet-Grady test procedure requires that the flies be knocked down rapidly, an appropriate amount of a mixture of methylated naphthalenes commercially available as Velsicol AR—50 (containing a minimum of 70% methylated naphthalenes, mostly di- and tri-methyl naphthalenes, was added as a knockdown agent to the test formulations. The results of the tests are given in the following table:

| Formulation | 24-Hr. Kill |
|---|---|
|  | Per cent |
| AR-50, 20% vol. | |
| Deobase, 80% vol. | 26.6 |
| Chloranil-cyclopentadiene adduct of Example 1: | |
| AR-50, 20% vol., 1% | |
| Deobase, 80% vol., 99% | 70.0 |

Inspection of the above data makes clear the high degree of insecticidal activity of the composition containing the halogenated quinonediene adduct as an active ingredient.

The data, examples, and description given in the foregoing specification have been set forth for purposes of exemplification, and are not to be construed as limitations. The scope of my invention is defined in the following claims.

I claim as my invention:

1. An insecticidal composition comprising an adduct of a halogenated quinone and a conjugated cyclic diene, distended in a carrier dust.

2. An insecticidal composition comprising an adduct of a halogenated quinone and cyclopentadiene, distended in a carrier dust.

3. An insecticidal composition comprising the adduct of tetrachlorobenzoquinone and cyclopentadiene, distended in a carrier dust.

JULIUS HYMAN.

REFERENCES CITED

The following references are of record in the file of this patent:

UNITED STATES PATENTS

| Number | Name | Date |
|---|---|---|
| 1,967,862 | Carothers | July 24, 1934 |
| 2,329,074 | Muller | Sept. 7, 1943 |
| 2,349,772 | ter Horst | May 23, 1944 |
| 2,368,667 | Ladd | Feb. 6, 1945 |
| 2,382,038 | Bruson | Aug. 14, 1945 |
| 2,395,455 | Bruson | Feb. 26, 1946 |

FOREIGN PATENTS

| Number | Country | Date |
|---|---|---|
| 324,661 | Great Britain | Jan. 27, 1930 |

OTHER REFERENCES

Annalen 348, 31–49 (1906) by Albrecht.